(12) United States Patent
Combessis et al.

(10) Patent No.: US 10,134,503 B2
(45) Date of Patent: Nov. 20, 2018

(54) MEDIUM-VOLTAGE OR HIGH-VOLTAGE ELECTRICAL DEVICE

(71) Applicant: NEXANS, Paris (FR)

(72) Inventors: Anthony Combessis, Marseilles (FR); Laurent Keromnes, Chaponost (FR); Melek Maugin, Chassagny (FR); Lucile Carteron, Lyons (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/528,703

(22) PCT Filed: Nov. 12, 2015

(86) PCT No.: PCT/FR2015/053062
§ 371 (c)(1),
(2) Date: May 22, 2017

(87) PCT Pub. No.: WO2016/083701
PCT Pub. Date: Jun. 2, 2016

(65) Prior Publication Data
US 2017/0263348 A1    Sep. 14, 2017

(30) Foreign Application Priority Data

Nov. 26, 2014  (FR) .................................... 14 61508

(51) Int. Cl.
*H01B 7/00*    (2006.01)
*H01B 3/40*    (2006.01)
(Continued)

(52) U.S. Cl.
CPC ............ *H01B 3/40* (2013.01); *C08F 224/00* (2013.01); *H01B 3/441* (2013.01); *H01B 3/447* (2013.01); *H01R 4/10* (2013.01)

(58) Field of Classification Search
CPC ... H01B 1/12; H01B 3/40; H01B 7/02; H01B 7/04; H01B 7/06; H01B 7/282;
(Continued)

(56) References Cited

U.S. PATENT DOCUMENTS 4,312,793 A * 1/1982 Charneski ............... H01R 3/08
                                                    252/513
7,923,500 B2 * 4/2011 Siegel ...................... C08K 3/22
                                                    524/430

(Continued)

FOREIGN PATENT DOCUMENTS

| EP | 0 750 319 A1 * | 12/1996 | ............... H01B 7/28 |
| EP | 1 719 804 A1 * | 2/2005 | ............ C08L 101/00 |
| EP | 2 444 455 A1 * | 10/2010 | ............... C08K 3/04 |

OTHER PUBLICATIONS

International Search Report dated Apr. 22, 2015.

*Primary Examiner* — William H Mayo, III
(74) *Attorney, Agent, or Firm* — Sofer & Haroun, LLP

(57) ABSTRACT

A semi-conductive crosslinked layer produced from a polymer composition includes at least one polymer A having at least one epoxy function. A cross-linking agent B includes at least one reactive function that can react with the epoxy function of said polymer A in order to allow the cross-linking of said polymer A. The polymer composition also has an electrically conductive filler having a specific surface area BET of at least 100 m2/g according to the ASTM standard D 6556.

24 Claims, 2 Drawing Sheets

(51) Int. Cl.
*H01B 3/44* (2006.01)
*H01R 4/10* (2006.01)
*C08F 224/00* (2006.01)

(58) Field of Classification Search
CPC . H01B 9/027; H01B 13/24; C08F 8/00; C08F 224/00
USPC .......... 174/110 R, 110 SC, 113 R, 120 R, 174/120 SC, 121 R, 121 SC; 524/430, 524/431; 428/375, 379, 383
See application file for complete search history.

(56) References Cited

U.S. PATENT DOCUMENTS

| | | | |
|---|---|---|---|
| 2003/0032728 A1* | 2/2003 | Arhart | C08F 8/42 525/100 |
| 2007/0129481 A1 | 6/2007 | Yamaguchi et al. | |
| 2010/0025073 A1* | 2/2010 | Fagrell | C08L 23/0892 174/120 SC |
| 2010/0206607 A1* | 8/2010 | Noyens | B82Y 10/00 174/102 SC |
| 2012/0212904 A1* | 8/2012 | Fleming | H01B 1/18 361/679.56 |
| 2013/0091342 A1 | 4/2013 | Liu et al. | |
| 2013/0206453 A1* | 8/2013 | Fagrell | H01B 1/12 174/120 SC |
| 2013/0220666 A1* | 8/2013 | Fagrell | C09D 123/0884 174/120 SC |
| 2014/0309337 A1* | 10/2014 | Nagano | C08J 5/24 523/428 |
| 2014/0363671 A1* | 12/2014 | Alric | C08F 255/02 428/383 |
| 2015/0004411 A1* | 1/2015 | Malik | C08L 23/0853 428/375 |
| 2016/0125975 A1* | 5/2016 | Briceno Garcia | H01B 3/40 174/84 R |

* cited by examiner

MEDIUM-VOLTAGE OR HIGH-VOLTAGE ELECTRICAL DEVICE

RELATED APPLICATION

This application is a National Phase of PCT/FR2015/053062, filed on Nov. 12, 2015 which in turn claims the benefit of priority from French Patent Application No. 14-61508, filed on Nov. 26, 2014, the entirety of which are incorporated by reference.

BACKGROUND

Field of the Invention

The present invention relates to an electrical device of the electrical cable or electrical cable accessory type. It typically, but not exclusively, applies to the fields of low-voltage (in particular of less than 6 kV), medium-voltage (in particular from 6 to 45-60 kV) or high-voltage (in particular greater than 60 kV, and which may range up to 800 kV) power cables, whether they are direct current or alternating current power cables.

Description of Related Art

High- or medium-voltage power cables or accessories typically comprise a semiconductive layer crosslinked by means of techniques well known to those skilled in the art, in particular by the peroxide route.

The peroxide route increasingly tends to be avoided with respect to the decomposition products of peroxide, which exhibit drawbacks during the manufacture of the cable, indeed even once the cable is in the operational configuration. This is because, during the crosslinking process, the peroxides decompose and form crosslinking by-products such as, in particular, methane, acetophenone, cumyl alcohol, acetone, tert-butanol, α-methylstyrene and/or water. The formation of water from cumyl alcohol is relatively slow and may occur after several months, indeed even a few years, once the cable is in the operational configuration. The risk of breakdown of the crosslinked layers is thus substantially increased. In addition, if the methane formed during the crosslinking stage is not discharged from the crosslinked layers, risks related to the explosiveness of methane and its ability to ignite cannot be ignored. This gas may also cause damage once the cable is put into service. Even if solutions exist for limiting the presence of methane within the cable, such as, for example, heat treating the cable in order to accelerate the diffusion of methane out of the cable, they become lengthy and expensive when the thickness of the crosslinked layers is high.

In addition, the electrically conductive fillers typically used are carbon black, which is added in substantial quantities in order to make the crosslinkable composition semi-conductive. This substantial content of electrically conductive filler both makes it difficult to process such a crosslinkable composition, in particular in rheological terms, and necessitates a multistep preparation of the composition in order to prevent any premature crosslinking of the polymer composition subsequent to the increase in temperature which may occur when adding the carbon black.

OBJECTS AND SUMMARY

The aim of the present invention is to overcome the drawbacks of the prior art by proposing an electrical device of the electrical cable or electrical cable accessory type, comprising a crosslinked semiconductive layer the manufacture of which substantially limits the presence of crosslinking by-products such as, for example, methane and/or water, while being easy to process and guaranteeing optimum mechanical properties over the life of the electrical device.

One subject of the present invention is an electrical device comprising a semiconductive crosslinked layer obtained from a polymer composition comprising:

- at least one polymer A comprising at least one epoxy functional group; and
- a crosslinking agent B comprising at least one reactive functional group capable of reacting with the epoxy functional group of said polymer A in order to allow the crosslinking of said polymer A,
- characterized in that the polymer composition additionally comprises an electrically conductive filler having a BET specific surface area of at least 100 $m^2/g$ according to ASTM standard D 6556 (2014).

The electrically conductive filler may have a BET specific surface area of at most 2000 $m^2/g$, and preferably at most 1000 $m^2/g$, according to ASTM standard D 6556 (2014).

In the present invention, ASTM standard D 6556 (2014) corresponds to ASTM standard D 6556-14.

By virtue of the invention, the crosslinked layer makes it possible to avoid the use of organic peroxide, while guaranteeing both a high degree of crosslinking and very good mechanical properties of the type consisting of tensile strength and elongation at break according to standard NF EN 608 11-1-1, over the life of the electrical device.

In addition, an advantage of the crosslinked layer of the invention is that it is inexpensive, easy to process, in particular by extrusion, and easy to manufacture since it does not require resorting to restrictive venting processes or to multistep preparation.

The Electrically Conductive Filler

The electrically conductive filler of the invention is preferably a carbon filler.

The term "carbon filler" is understood to mean any particle, or mixture of particles, that is predominantly composed of carbon atoms, which may or may not be functionalized and which may or may not be grafted. The conductive carbon filler exhibits electrical conduction properties.

By way of examples, the conductive carbon filler may be chosen from among carbon blacks, carbon fibers, graphites, graphemes, fullerenes, carbon nanotubes, and a mixture thereof.

The electrically conductive filler of the invention is preferably a nanoparticle.

Nanoparticles typically have at least one of their dimensions on the nanometer scale ($10^{-9}$ m).

The term "dimension" is understood to mean the number-average dimension of all of the nanoparticles of a given population, this dimension being conventionally determined by methods well known to a person skilled in the art.

The dimension of the nanoparticles according to the invention may, for example, be determined by microscopy, in particular by transmission electron microscopy (TEM).

The number-average dimension of the nanoparticles may in particular be at most 400 nm, preferably at most 300 nm, and more preferably at most 100 nm.

Particularly preferably, the number-average dimension of the nanoparticles is at least 1 nm and at most 100 nm, preferably at least 1 nm and at most 50 nm, and particularly preferably at least 1 and at most 3 nm.

In one particularly preferred embodiment, the aspect ratio of the electrically conductive filler of the invention is at least 10, preferably at least 100, and particularly preferably at least 200. The aspect ratio is typically the ratio between the smallest dimension of the conductive filler (such as, for example, the diameter of the conductive filler for carbon nanotubes) and the largest dimension of said conductive filler (such as, for example, the length of the conductive filler for carbon nanotubes).

Carbon nanotubes will preferably be used as the electrically conductive filler according to the invention. An advantage of carbon nanotubes is that they exhibit better compatibility with the polymer A with respect to the other types of conductive carbon fillers mentioned in the present invention.

The term "nanotubes" is understood to mean substantially elongate nanoparticles. Nanotubes are conventionally said to be "acicular" in shape.

There are multiple possible types of carbon nanotube. They may be chosen from among single-walled carbon nanotubes, double-walled carbon nanotubes, multi-walled carbon nanotubes, and a mixture thereof. Multi-walled carbon nanotubes (MWNTs) will preferably be used.

The electrically conductive filler of the invention may be added as it is to the polymer composition, or in the form of a masterbatch.

In one particular embodiment, the polymer composition may comprise a sufficient amount of electrically conductive fillers to make it possible to obtain the desired properties in the electrical device.

The amount of electrically conductive filler in the polymer composition of the invention is in particular sufficient to make it possible to form a percolating network during the crosslinking of the polymer composition.

More particularly, the amount of electrically conductive filler is sufficient to allow the polymer composition of the invention to undergo a percolation transition referred to as a "dynamic" percolation transition during the crosslinking of the composition in order to form the crosslinked layer, in particular by heat treatment.

"Dynamic percolation" is understood to mean an insulator/conductor transition (i.e. an increase of several orders of magnitude in the electrical conductivity associated with the mesoscopic scale by the formation and the growth of clusters of electrically conductive particles which tend to form an infinite cluster of inter-connected fillers) observed at constant filler content and resulting from a microstructural rearrangement in the molten state of the composite by self-assembly of the electrically conductive fillers in the layer crosslinked using a heat treatment.

In addition, the amount of electrically conductive fillers in the polymer composition of the invention is in particular limited so as to be able to guarantee a low viscosity of the polymer composition and thus optimum rheological properties before the polymer composition has been crosslinked.

The amount of electrically conductive fillers in the polymer composition may advantageously be an amount that is limited so as not to make the polymer composition semi-conductive, or stated otherwise so that it is electrically insulating, but which is sufficient to make the crosslinked layer semiconductive once the polymer composition has been heat-treated.

Thus, the electrical conductivity of the polymer composition is advantageously different from the electrical conductivity of the crosslinked layer.

More particularly, the electrical conductivity of the polymer composition is lower than the electrical conductivity of the crosslinked layer. The electrical conductivity of the polymer composition may be at least 10 times lower than the electrical conductivity of the crosslinked layer, preferably at least 100 times lower than the electrical conductivity of the crosslinked layer, and particularly preferably at least 1000 times lower than the electrical conductivity of the crosslinked layer.

In the present invention, the term "electrically insulating", when used for characterizing the polymer composition, is understood to mean a composition the electrical conductivity of which may be at most $1.10^{-6}$ S/m (siemens per meter), preferably at most $1.10^{-8}$ S/m, and preferably strictly lower than $1.10^{-8}$ S/m, measured at 25° C. under a direct current.

By way of example, the polymer composition may comprise at most 20.0 parts by weight of electrically conductive fillers, preferably at most 15.0 parts by weight of electrically conductive fillers, and particularly preferably at most 10.0 parts by weight of electrically conductive fillers, per 100 parts by weight of polymer A in the composition. The polymer composition may additionally comprise at least 0.1 parts by weight of electrically conductive fillers per 100 parts by weight of polymer A in the composition.

In one particularly preferred embodiment, the polymer composition of the invention may comprise at most 20% by weight of electrically conductive filler according to the invention, preferably at most 15% by weight of electrically conductive filler according to the invention and preferably at most 10% by weight of electrically conductive filler according to the invention with respect to the total weight of the polymer composition. Preferably, the polymer composition of the invention may comprise at least 1% by weight of electrically conductive filler according to the invention, preferably at least 2% by weight of electrically conductive filler according to the invention and particularly preferably at least 5% by weight of electrically conductive filler according to the invention with respect to the total weight of the polymer composition.

The low electrically conductive filler content used in the invention advantageously makes it possible to avoid carrying out two-step processes for manufacturing the semiconductive crosslinked layer. Specifically, the small amount of electrically conductive filler added to the polymer A and to the crosslinking agent B allows a mixture of these three components (i.e. polymer A, crosslinking agent B and said electrically conductive filler) to be produced in a single step, in particular in one and the same mixer, since the increase in temperature that is liable to occur upon the addition of said electrically conductive filler is substantially limited and would not be capable of triggering any premature crosslinking of the polymer composition.

Stated otherwise, it is not necessary to add the crosslinking agent to the polymer composition in a separate step subsequent to that of the addition of the filler.

When the electrically conductive filler of the invention is carbon nanotubes, the amount of said filler may be at most 10.0 parts by weight of electrically conductive fillers per 100 parts by weight of polymer in the composition. This is because carbon nanotubes, which have a high aspect ratio (in particular an aspect ratio of at least 100), make it possible to achieve the percolation with relatively smaller amounts of conductive carbon fillers in comparison with the other carbon fillers.

The Polymer A

The epoxy functional group (i.e. the epoxide functional group) of the polymer A is more particularly an oxirane functional group (i.e. an ethylene oxide group).

Preferably, the epoxy functional group may be provided by a compound comprising said epoxy functional group, it being possible for this compound to be chosen from among the glycidyl esters. Thus, the polymer of the invention may comprise glycidyl ester groups.

The polymer A of the invention may comprise at most 10% by weight of epoxy functional group and preferably at most 5% by weight of epoxy functional group with respect to the total weight of polymer A.

The polymer A of the invention may comprise at least 0.1% by weight of epoxy functional group and preferably at least 1% by weight of epoxy functional group.

According to a first variant, the epoxy functional group of the polymer A may be grafted to said polymer. The polymer comprising at least one epoxy functional group of the invention is, according to this first variant, an epoxy-grafted polymer. Stated otherwise, the polymer according to the invention may be a polymer comprising at least one epoxy functional group grafted to the macromolecular chain (i.e. main chain or backbone) of said polymer. The ends of the macromolecular chain of the polymer may or may not, for their part, be grafted with the epoxy functional group.

According to a second variant, the polymer comprising at least one epoxy functional group of the invention may be a copolymer obtained from at least two monomers, one of the two monomers comprising said epoxy functional group. Said monomer comprising said epoxy functional group may be chosen from among the following compounds: butenecarboxylic acid monoglycidyl ester, glycidyl methacrylate, glycidyl acrylate, methylglycidyl acrylate, methylglycidyl methacrylate, itaconic acid glycidyl ester, 7,8-epoxy-1-octyl methacrylate, itaconic acid methylglycidyl ester, 7,8-epoxy-1-octyl vinyl ether, vinyl glycidyl ether, allyl glycidyl ether and 2-methyl-2-propenyl glycidyl ether.

By way of example of a polymer comprising at least one epoxy functional group, mention may be made of a copolymer of ethylene and glycidyl methacrylate.

The polymer A of the invention is more particularly an organic polymer, making it possible in particular to shape the polymer composition by extrusion.

The polymer A may comprise at least one polyolefin. The term "polyolefin" as such generally means a polymer obtained from at least one olefin monomer, and may be an olefin polymer of the olefin homopolymer or copolymer type. Preferably, said olefin polymer is a noncyclic olefin polymer.

In the present invention, it will be preferable to use an ethylene polymer (ethylene homo- or copolymer) or a propylene polymer (propylene homo- or copolymer).

The first variant of the invention may be used with an epoxy-grafted olefin homopolymer or an epoxy-grafted olefin copolymer.

The second variant of the invention may be used with a copolymer obtained from an olefin monomer and a monomer comprising at least one epoxy functional group, as described above.

The polymer composition of the invention may comprise more than 50.0 parts by weight of polymer(s) comprising at least one epoxy functional group (i.e. polymer A) per 100 parts by weight of polymer(s) (i.e. polymer matrix) in the polymer composition; preferably at least 70 parts by weight of polymer(s) A per 100 parts by weight of polymer(s) in said polymer composition; and particularly preferably at least 90 parts by weight of polymer(s) A per 100 parts by weight of polymer(s) in said polymer composition.

Particularly advantageously, the constituent polymer or polymers of the polymer composition are solely one or more olefin-based polymer(s) (i.e. olefin homopolymer and/or copolymer).

In one particular embodiment, the polymer of the invention may additionally comprise at least one acrylate functional group. This acrylate functional group advantageously makes it possible to render the polymer of the invention supple and more flexible.

According to a first variant, the acrylate functional group may be grafted to the polymer of the invention. The polymer of the invention is, according to this first variant, an acrylate-grafted polymer. Stated otherwise, the polymer according to the invention may be a polymer comprising at least one acrylate functional group grafted to the macromolecular chain (i.e. main chain or backbone) of said polymer. The ends of the macromolecular chain of the polymer may or may not, for their part, be grafted with the acrylate functional group.

According to a second variant, the polymer of the invention may be a copolymer obtained from at least two monomers, one of the two monomers comprising said acrylate functional group. By way of example, mention may be made of the terpolymer of ethylene, methylacrylate and glycidyl methacrylate.

In one particular embodiment, the polymer composition of the invention may comprise at least 30% by weight of polymer A, preferably more than 50% by weight of polymer A, preferably at least 60% by weight of polymer A and preferably at least 70% by weight of polymer with respect to the total weight of the polymer composition.

The Crosslinking Agent B

The crosslinking agent B of the invention may be a polymeric compound or a non-polymeric compound. Preferably, the crosslinking agent is different from the polymer A.

It will be preferable to use a non-polymeric compound as compound B since this type of crosslinking agent advantageously makes it possible to improve the electrical breakdown resistance of the crosslinked layer, in particular according to standard IEC 62539, at 20° C., based on the Weibull distribution.

When the crosslinking agent of the invention is of the "non-polymeric" type, it does not result from the covalent linking of a large number of identical or different monomer units and preferably it does not result from the covalent linking of at least two identical or different monomer units.

The reactive functional group of the crosslinking agent is capable of reacting with the epoxy functional group of said polymer in order to make possible the crosslinking of said polymer. It will react directly with the epoxy functional group after the opening of the epoxy during an increase in temperature.

The reactive functional group of the crosslinking agent may be chosen from among an anhydride functional group, a carboxyl functional group and an amine functional group.

When the crosslinking agent comprises at least one amine functional group, the amine functional group is a primary or secondary amine.

In one particular embodiment, the crosslinking agent may comprise at least two reactive functional groups. These two reactive functional groups may be identical or different and may be chosen without distinction from among an anhydride functional group, a carboxyl functional group and an amine functional group.

The crosslinking agent may preferably comprise an amine functional group and a carboxyl functional group.

The crosslinking agent may preferably comprise two amine functional groups.

By way of examples of non-polymeric crosslinking agents, mention may be made of amino acids, diamines, anhydrides, Lewis acids or Brønsted acids. A mixture thereof may also be produced.

The preferred non-polymeric crosslinking agent of the invention is chosen from among:
- a non-polymeric compound comprising at least one amine functional group and at least one carboxyl functional group, i.e. an amino acid;
- a non-polymeric compound comprising at least one anhydride functional group, preferably in combination with a crosslinking catalyst; and
- a mixture thereof.

Amino acids typically comprise two functional groups: a carboxyl —COOH functional group and an amine functional group which is preferably of the primary amine —$NH_2$ type. The carbon chain separating the carboxyl functional group from the amine functional group may comprise from 1 to 50 carbon atoms and preferably from 1 to 20 carbon atoms. Conventionally, the carboxyl and amine functional groups may be positioned at the ends of the main carbon chain of said amino acid, the main carbon chain preferably being an unbranched chain. The amino acid may also be an α-amino acid, which is defined by the fact that the amine functional group is bonded to the carbon atom adjacent to the carboxyl functional group (the α carbon).

By way of preferred example, mention may be made of 11-aminoundecanoic acid.

When the crosslinking agent is a non-polymeric compound comprising an anhydride functional group, the composition may additionally comprise a crosslinking catalyst or, stated otherwise, said non-polymeric compound comprising an anhydride functional group is combined, in the polymer composition, with a crosslinking catalyst.

The non-polymeric compound comprising an anhydride functional group is more particularly an organic compound. Stated otherwise, the non-polymeric compound comprising an anhydride functional group is composed solely of carbon and of hydrogen and optionally of oxygen.

More particularly, said non-polymeric compound comprising an anhydride functional group additionally comprises an aliphatic chain comprising at least five carbon atoms, it being possible for this chain to be saturated or unsaturated.

By way of example, mention may be made of dodecenylsuccinic anhydride.

By way of examples of polymeric crosslinking agents, mention may be made of copolymers of olefin and unsaturated monocarboxylic acid, copolymers of olefin and unsaturated dicarboxylic acid or copolymers of olefin and unsaturated dicarboxylic acid anhydride. The olefin cited for these copolymers is preferably ethylene.

The polymer composition in accordance with the invention may comprise an amount of crosslinking agent B in an amount necessary and sufficient to obtain the crosslinked layer.

By way of example, the polymer composition in accordance with the invention may comprise at most 15.0 parts by weight of crosslinking agent B, preferably at most 10.0 parts by weight of crosslinking agent B and preferably at most 5.0 parts by weight of crosslinking agent B per 100 parts by weight of polymer A in the composition.

The polymer composition in accordance with the invention may comprise at least 0.1 part by weight of crosslinking agent B, and preferably at least 0.5 part by weight of crosslinking agent B per 100 parts by weight of polymer A in the composition.

The Compound C

In one particular embodiment, the composition may comprise:
- at least one aromatic group, and
- a reactive group capable of interacting physically with the hydroxyl functional group formed by the opening of said epoxy functional group during the crosslinking of the polymer A.

The reactive group of the compound C is in particular capable of interacting physically with the hydroxyl functional group which is formed during the crosslinking of the polymer A with the compound B. Stated otherwise, the reactive group of the compound C is not capable of interacting chemically with the hydroxyl functional group formed from the epoxy functional group of the polymer A during the crosslinking of the polymer composition. It thus does not modify the chemical structure of said hydroxyl functional group; in particular, it is not capable of forming a chemical bond of the covalent type with said hydroxyl functional group.

More particularly, said reactive group is capable of forming van der Waals' bonds and/or hydrogen bonds with the hydroxyl groups originating from the epoxy functional groups of the polymer A, once opened.

The compound C makes it possible to substantially limit, indeed even to prevent, the epoxy functional groups liable to have not reacted during the crosslinking of the polymer composition from reacting chemically by etherification with the hydroxyl groups originating from the epoxy functional groups, once opened.

The compound C will thus sterically hinder the hydroxyl groups originating from the epoxy functional groups already opened and will thus significantly limit, indeed even prevent, the etherification of the epoxy functional groups liable to have not reacted during the crosslinking process.

The compound C may be different from the polymer A and from the crosslinking agent B. It is preferably an organic compound.

The compound C may be a polymeric or non-polymeric compound.

"Non-polymeric compound" is understood to mean a compound other than a polymer. Stated otherwise, this compound does not in particular result from the covalent linking of a large number of identical or different monomer units and more particularly does not result from the covalent linking of at least two identical or different monomer units.

Particularly preferably, the compound C is an antioxidant.

The reactive group of the compound C may be a hydrogen atom, in particular in the form of a hydroxyl (OH) group and/or of an amine (NH) group, it being possible for the amine to be of the primary or secondary type.

The aromatic group of the compound C may be a benzene group or one of its derivatives.

According to a first variant, the aromatic group together with the reactive group may form a phenol group.

Preferably, the phenol group is di-substituted in the ortho position.

By way of examples, mention may be made of the following compounds, comprising at least one phenol group di-substituted in the ortho position:
- 2-methyl-4,6-bis[(octylthio)methyl]phenol (Irgastab KV10; CAS No. 110553-27-0);
- benzenepropanoic acid, 3,5-bis(1,1-dimethylethyl)-4-hydroxy-, 1,1'-(2,2-bis((3-(3,5-bis(1,1-dimethylethyl)-4-hydroxyphenyl)-1-oxopropoxy)methyl)-1,3-propanediyl) ester (Irganox 1010; CAS No. 6683-19-8);

3,5-bis(1,1-dimethylethyl)-4-hydroxybenzenepropanoic acid octadecyl ester (Irganox 1076; CAS No. 2082-79-3);

1,3,5-trimethyl-2,4,6-tris[3',5'-di(tert-butyl)-4'-hydroxybenzyl]benzene (Irganox 1330; CAS No. 1709-70-2);

thiodiethylene bis{3-[3,5-di(tert-butyl)-4-hydroxyphenyl]propionate} (Irganox 1035; CAS No. 41484-35-9).

Particularly preferably, the phenol group is a di(tert-butyl)-4-hydroxyphenyl group. By way of examples, mention may be made of Irganox 1010, Irganox 1076, Irganox 1330 or Irganox 1035.

In this first variant, the compound C may thus be Irganox 1035 or else a compound which is not Irganox 1035.

According to a second variant, the aromatic group together with the reactive group form an aminobenzene group, the amine of which is of the primary or secondary type. By way of examples, mention may be made of 1,2-dihydro-2,2,4-trimethylquinoline or poly(1,2-dihydro-2,2,4-trimethylquinoline) (CAS No. 26780-96-1).

The compound C of the invention may additionally comprise a thioether group. By way of examples, mention may be made of Irgastab KV10 or Irganox 1035.

The polymer composition in accordance with the invention may comprise at most 10.0 parts by weight of compound C, preferably at most 5.0 parts by weight of compound C, preferably at most 2.0 parts by weight of compound C and particularly preferably at most 1.0 part by weight of compound C per 100 parts by weight of polymer A in the composition.

The polymer composition in accordance with the invention may comprise at least 0.01 part by weight of compound C and preferably at least 0.1 part by weight of compound C per 100 parts by weight of polymer A in the composition.

The Fillers

The polymer composition of the invention may additionally comprise one or more other fillers, different from the electrically conductive filler of the invention.

Said other filler of the invention may be an inorganic or organic filler. It may be chosen from among a flame-retardant filler and an inert filler (or non-combustible filler).

By way of example, the flame-retardant filler may be a hydrated filler chosen in particular from among metal hydroxides, such as, for example, magnesium dihydroxide (MDH) or aluminum trihydroxide (ATH). These flame-retardant fillers act mainly by the physical route by decomposing endothermically (e.g., release of water), which has the consequence of lowering the temperature of the crosslinked layer and of limiting the propagation of the flames along the electrical device. The term "flame-retardant properties" is used in particular.

For its part, the inert filler may be, for example, chalk, talc or clay (e.g., kaolin).

The polymer composition may comprise at least 1.0 part by weight of other filler, preferably at least 10.0 parts by weight of filler and more preferably still at least 20.0 parts by weight of filler per 100 parts by weight of polymer A in the composition.

According to another feature of the invention and in order to guarantee an "HFFR" (halogen-free flame retardant) electrical device, the electrical device, or stated otherwise the elements which make up said electrical device, preferably does/do not comprise halogenated compounds. These halogenated compounds may be of any nature, such as, for example, fluoropolymers or chloropolymers, such as poly-vinyl chloride (PVC), halogenated plasticizers, halogenated inorganic fillers, and the like.

The Additives

The composition may typically additionally comprise additives in an amount of 0.1 to 20 parts by weight per 100 parts by weight of polymer A in the composition. The additives are well known to a person skilled in the art and may, for example, be chosen from among protective agents (e.g., UV stabilizers, agents for combating copper), processing aids (e.g., plasticizers, viscosity reducers), pigments and various antioxidants of compound C.

As mentioned above, the polymer composition may also comprise a crosslinking catalyst in order to aid in the crosslinking process. This crosslinking catalyst may be more particularly used when the non-polymeric crosslinking agent of the invention comprises a reactive functional group of the anhydride type.

The crosslinking catalyst may be a catalyst of the Lewis base type or, stated otherwise, a nucleophilic chemical entity, one of the constituents of which has a pair or more of free or non-bonding electrons in its valence shell.

By way of examples, the crosslinking catalyst may be chosen from among imides, tertiary amines, imidazoles and a mixture thereof.

Crosslinking catalysts of phenol type would be preferred in the context of the invention, this catalyst being in particular a Lewis base, such as, for example, 2,4,6-tris(dimethylaminoethyl)phenol.

When the polymer composition comprises a crosslinking catalyst, in particular in the presence of a non-polymeric crosslinking agent comprising a reactive functional group of the anhydride type, the polymer composition may comprise from 0.01 to 2.0 parts by weight of crosslinking catalyst and preferably from 0.05 to 1.0 part by weight of crosslinking catalyst per 100 parts by weight of polymer A.

The Crosslinked Layer and the Electrical Device

In the present invention, the crosslinked layer may be easily characterized by determining its gel content according to ASTM standard D 2765-01.

More particularly, said crosslinked layer may advantageously have a gel content, according to ASTM standard D 2765-01 (extraction with xylene), of at least 50%, preferably of at least 70%, preferably of at least 80% and particularly preferably of at least 90%.

In the present invention, "semiconductive layer" is understood to mean a layer the electrical conductivity of which may be at least $1.10^{-8}$ S/m (siemens per meter), preferably strictly higher than $1.10^{-8}$ S/m, preferably at least $1.10^{-3}$ S/m and preferably may be less than $1.10^{3}$ S/m, measured at 25° C. under a direct current.

The crosslinked layer of the invention may be a layer extruded or a layer molded by processes well known to a person skilled in the art.

The electrical device of the invention relates more particularly to the field of electrical cables or electrical cable accessories, operating under direct current (DC) or under alternating current (AC).

The electrical device of the invention may be an electrical cable or an electrical cable accessory.

According to a first embodiment, the device according to the invention is an electrical cable comprising an elongated electrically conductive element surrounded by said semiconductive crosslinked layer.

In this embodiment, the crosslinked layer is preferably a layer extruded by techniques well known to a person skilled in the art.

In one preferred embodiment, the crosslinked layer may be one or both semiconductive layers of an insulating system comprising:

a first semiconductive layer surrounding the electrically conductive element;

an electrically insulating layer surrounding the first semiconductive layer; and a second semiconductive layer surrounding the electrically insulating layer.

More particularly, the elongated electrically conductive element may be surrounded by a first semiconductive layer, an electrically insulating layer surrounding the first semiconductive layer, and a second semiconductive layer surrounding the electrically insulating layer, the crosslinked layer being the first and/or the second semiconductive layer(s). Reference is made to a medium- or high-voltage cable.

According to a second embodiment, the device according to the invention is an electrical cable accessory, said accessory comprising said crosslinked layer.

Said accessory is intended to surround, or surrounds when it is positioned around the cable, the elongated electrically conductive element of an electrical cable. More particularly, said accessory is intended to surround or surrounds an electrical cable and it is preferably intended to surround or surrounds at least a portion or end of an electrical cable. The accessory may in particular be a junction or termination for an electrical cable.

The accessory may typically be a hollow longitudinal body, such as, for example, a junction or termination for an electrical cable, in which at least a portion of an electrical cable is intended to be positioned.

The accessory includes at least one semiconductive element and at least one electrically insulating element, these elements being intended to surround at least a portion or end of an electrical cable. The semiconductive element is well known for controlling the geometry of the electric field, when the electrical cable, in combination with said accessory, is under voltage.

The crosslinked layer of the invention may be the one or more semiconductive element(s) of the accessory.

When the accessory is a junction, the latter makes it possible to connect together two electrical cables, the junction being intended to surround or surrounding, at least in part, these two electrical cables. More particularly, the end of each electrical cable intended to be connected is positioned inside said junction.

When the device of the invention is a termination for an electrical cable, the termination is intended to surround or surrounds, at least in part, an electrical cable. More particularly, the end of the electrical cable intended to be connected is positioned inside said termination.

When the electrical device is an accessory for an electrical cable, the crosslinked layer is preferably a layer molded by techniques well known to a person skilled in the art.

In the present invention, the elongated electrically conductive element of the electrical cable may be a metal wire or a plurality of metal wires, which may or may not be twisted, in particular made of copper and/or of aluminum, or an alloy thereof.

Another subject of the invention relates to a process for manufacturing an electrical device according to the invention, characterized in that the polymer composition, which is in particular electrically insulating, is heat-treated in order to obtain the semiconductive crosslinked layer.

Another subject of the invention relates to a process for manufacturing an electrical device of the electrical cable type according to the invention, characterized in that it comprises the following steps:

i. extruding the polymer composition around an elongated electrically conductive element, in order to obtain an extruded layer; and ii. crosslinking the extruded layer of step i.

Step i may be carried out by techniques well known to a person skilled in the art, using an extruder.

During step i, the temperature within the extruder should preferably not exceed the temperature of opening of the epoxy functional group of the polymer A, in order to prevent any crosslinking within the extruder. By way of example, the temperature for processing the polymer composition by extrusion is lower than 200° C. and preferably lower than 150° C.

The electrically conductive filler may be added at the same time as the other compounds of the polymer composition, in particular at the same time as the crosslinking agent B, without fear of a substantial increase in temperature when processing the polymer composition. Thus, it is not necessary, in order to prevent any premature crosslinking of the polymer composition, to add the cross-linking agent B in a separate step subsequent to that of the addition of the electrically conductive filler.

There is thus obtained, at the extruder outlet, a layer extruded around said electrically conductive element which may or may not be in direct physical contact with said electrically conductive element.

At the extruder outlet, the extruded layer is thus a "non-crosslinked" layer.

The term "non-crosslinked" is understood to mean a layer the gel content of which, according to ASTM standard D 2765-01 (extraction with xylene), is at most 20%, preferably at most 10%, preferably at most 5% and particularly preferably 0%.

In addition, at the end of step i, the composition extruded in the form of a layer is preferably an electrically insulating composition.

Prior to step i, the constituent compounds of the polymer composition of the invention may be mixed, in particular with the polymer A in the molten state, in order to obtain a homogeneous mixture. The temperature within the mixer may be sufficient to obtain a polymer A in the molten state but is limited in order to prevent the opening of the epoxy functional group of the polymer, and hence the crosslinking of the polymer A.

The homogeneous mixture may then be granulated by techniques well known to a person skilled in the art. These granules may subsequently feed an extruder in order to carry out step i.

Step ii may be carried out by thermal route, for example using a continuous vulcanization line (CV line), a steam tube, a bath of molten salt, an oven or a thermal chamber, these techniques being well known to a person skilled in the art. By way of example, the temperature of crosslinking of the polymer A of the invention is lower than 300° C., and preferably lower than or equal to 250° C.

At the extruder outlet, the composition extruded in the form of a layer around the electrically conductive element may subsequently be subjected to a temperature sufficient to make it possible to open the epoxy functional group of the polymer A and thus to cause the crosslinking agent to react with the opened epoxy functional group. An extruded and crosslinked layer is then obtained.

Step ii thus makes it possible to obtain a crosslinked layer having in particular a gel content, according to ASTM standard D 2765-01, of at least 40%, preferably of at least 50%, preferably of at least 60% and particularly preferably of at least 70%.

In addition, at the end of step ii, the extruded layer is a semiconductive layer.

Another subject of the invention relates to a process for manufacturing an electrical cable accessory, characterized in that it comprises the following steps:

i. molding the crosslinkable polymer composition, in order to obtain a molded layer; and
ii. crosslinking the molded layer of step i.

Step i may be carried out by techniques well known to a person skilled in the art, in particular by molding or extrusion-molding.

The constituent compounds of the polymer composition of the invention may be mixed prior to step i, as described above for the manufacture of a cable.

In addition, at the end of step i, the composition molded in the form of a layer is preferably an electrically insulating composition.

Step ii may be carried out by thermal route, for example using a heating mold, which may be the mold used in step i. In the mold, the composition of step i may subsequently be subjected to a sufficient temperature for a sufficient time to make it possible to obtain the desired degree of crosslinking. A molded and crosslinked layer is then obtained.

Step ii thus makes it possible to obtain a crosslinked layer having in particular a gel content, according to ASTM standard D 2765-01, of at least 40%, preferably of at least 50%, preferably of at least 60% and particularly preferably of at least 70%.

In addition, at the end of step ii, the molded layer is a semiconductive layer.

In the present invention, the crosslinking temperature and the crosslinking time of the extruded and/or molded layer employed are in particular dependent on the thickness of the layer, on the number of layers, on the presence or not of a crosslinking catalyst, on the type of crosslinking, and the like.

A person skilled in the art may easily determine these parameters by monitoring the change in crosslinking by virtue of determining the gel content according to ASTM standard D 2765-01 in order to obtain a crosslinked layer.

When an extruder is used, the temperature profile of the extruder and the extrusion rate are parameters which a person skilled in the art may also vary in order to guarantee that the desired properties are obtained.

BRIEF DESCRIPTION OF THE DRAWINGS

Other features and advantages of the present invention will become apparent in the light of the description of a non-limiting example of an electrical cable according to the invention, provided with reference to the figures.

DETAILED DESCRIPTION

For the sake of clarity, only those elements essential for the understanding of the invention have been represented schematically, this being done without observing a scale.

Figure 1:
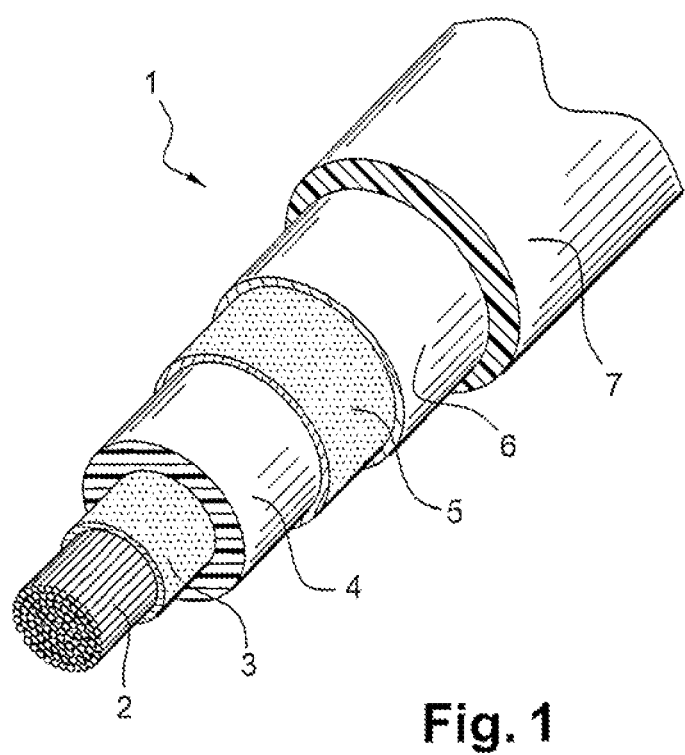
FIG. 1 shows a schematic view in cross section of an electrical cable according to one preferred embodiment in accordance with the invention.

The medium- or high-voltage power cable 1, illustrated in FIG. 1, comprises an elongated central conductive element 2, in particular made of copper or of aluminum. The power cable 1 additionally comprises several layers positioned successively and coaxially around this conductive element 2, namely: a first semiconductive layer 3, referred to as the "inner semiconductive layer", an electrically insulating layer 4, a second semiconductive layer 5, referred to as the "outer semiconductive layer", an earthing and/or protective metal shield 6 and an external protective sheath 7.

The semiconductive layer 3 and/or the semiconductive layer 5 may be extruded and crosslinked layers obtained from the polymer composition according to the invention.

The electrically insulating layer 4 is also an extruded and crosslinked layer.

The presence of the metal shield 6 and of the external protective sheath 7 is preferential but not essential, this cable structure being as such well known to a person skilled in the art.

Figure 2:
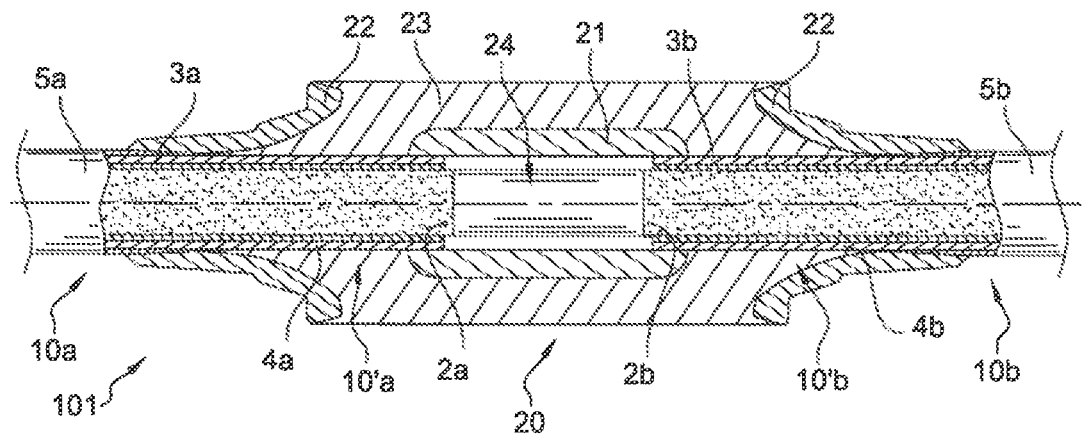
FIG. 2 shows a schematic view of an electrical device according to the invention, comprising a junction in longitudinal cross section, this junction surrounding the ends of two electrical cables.

FIG. 2 shows a device 101 comprising a junction 20 surrounding, in part, two electrical cables 10a and 10b.

More particularly, the electrical cables 10a and 10b comprise an end 10'a and 10'b, respectively, which are intended to be surrounded by the junction 20.

The body of the junction 20 comprises a first semiconductive element 21 and a second semiconductive element 22 separated by an electrically insulating element 23, said semiconductive elements 21, 22 and said electrically insulating element 23 surround the ends 10'a and 10'b of the electrical cables 10a and 10b, respectively.

This junction 20 makes it possible to electrically connect the first cable 10a to the second cable 10b, in particular by virtue of an electrical connector 24 positioned at the center of the junction 20.

The first semiconductive element 21 and/or the second semiconductive element 22 may be molded and crosslinked layers obtained from the polymer composition according to the invention.

The first electrical cable 10a comprises an electrical conductor 2a surrounded by a first semiconductive layer 3a, an electrically insulating layer 4a surrounding the first semiconductive layer 3a, and a second semiconductive layer 5a surrounding the electrically insulating layer 4a.

The second electrical cable 10b comprises an electrical conductor 2b surrounded by at least one first semiconductive layer 3b, an electrically insulating layer 4b surrounding the first semiconductive layer 3b, and a second semiconductive layer 5b surrounding the electrically insulating layer 4b.

These electrical cables 10a and 10b may be those described in the present invention.

At said end 10'a, 10'b of each electrical cable 10a, 10b, the second semiconductive layer 5a, 5b is at least partially denuded in order for the electrically insulating layer 4a, 4b to be at least partially positioned inside the junction 20, without being covered with the second semiconductive layer 5a, 5b of the cable.

Inside the junction 20, the electrically insulating layers 4a, 4b are in direct physical contact with the electrically insulating element 23 and the first semiconductive element 21 of the junction 20. The second semiconductive layers 5a, 5b are in direct physical contact with the second semiconductive element 22 of the junction 20.

Figure 3:
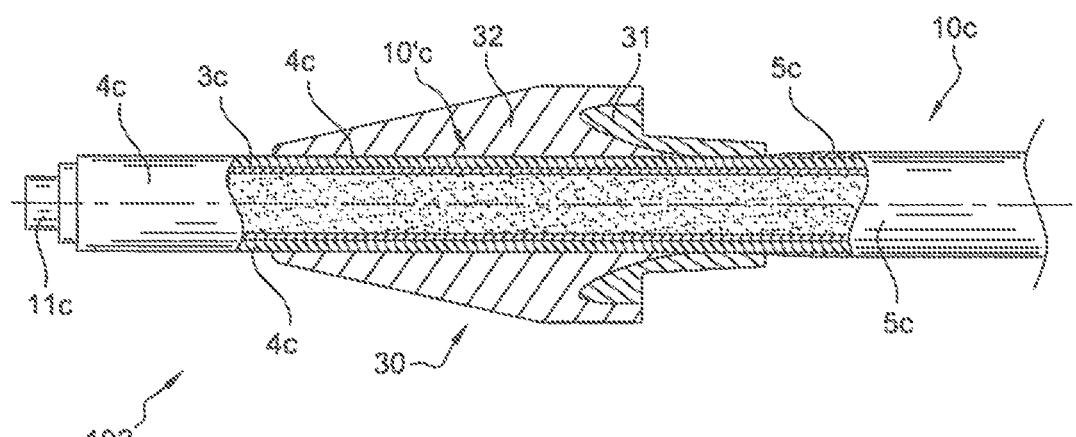
FIG. 3 shows a schematic view of an electrical device according to a first variant of the invention, comprising a termination in longitudinal cross section, this termination surrounding the end of a single electrical cable.

FIG. 3 shows a device 102 comprising a termination 30 surrounding a single electrical cable 10c.

More particularly, the electrical cable 10c comprises an end 10'c intended to be surrounded by the termination 30.

The body of the termination 30 comprises a semiconductive element 31 and an electrically insulating element 32, said semiconductive element 31 and said electrically insulating element 32 surrounding the end 10'c of the electrical cable 10c.

The semiconductive element 31 may be a molded and crosslinked layer obtained from the polymer composition according to the invention.

The electrical cable 10c comprises an electrical conductor 11c surrounded by a first semiconductive layer 3c, an electrically insulating layer 4c surrounding the first semiconductive layer 3c, and a second semiconductive layer 5c surrounding the electrically insulating layer 4c.

This electrical cable 10c may be that described in the present invention.

At said end 10'c of the electrical cable 10c, the second semiconductive layer 5c is at least partially denuded in order for the electrically insulating layer 4c to be at least partially positioned inside the termination 30, without being covered with the second semiconductive layer 5c of the cable.

Inside the termination 30, the electrically insulating layer 4c is in direct physical contact with the electrically insulating element 32 of the termination 30. The second semiconductive layer 5c is in direct physical contact with the semiconductive element 31 of the junction 30.

EXAMPLES

1. Crosslinkable Compositions

A comparative polymer composition C1, and comparative compositions I1 and I2 in accordance with the present invention, the amounts of the compounds of which are expressed as parts by weight per 100 parts by weight of the polymer(s), are collated in table 1 below, the colymer here being solely colymer/epoxy.

TABLE 1

| | Polymer composition | | |
|---|---|---|---|
| | C1 | I1 | I2 |
| Polymer/epoxy | 100 | 100 | 100 |
| Amino acid | 0.75 | 0.75 | 0.75 |
| Carbon black | 43 | 0 | 0 |
| Carbon nanotube 1 | 0 | 21.8 | 0 |
| Carbon nanotube 2 | 0 | 0 | 41.5 |
| Composition type | Semiconductive composition | Electrically insulating composition | Electrically insulating composition |

The percentage by weight of electrically conductive filler in the compositions C1, I1 and 12 is given in table 2 below.

TABLE 2

| | Polymer composition | | |
|---|---|---|---|
| | C1 | I1 | I2 |
| Electrically conductive filler (% by weight) | 29.9 | 5.3 | 5.0 |
| Composition type | Semiconductive composition | Electrically insulating composition | Electrically insulating composition |

The compounds of table 1 have the following origins:
polymer/epoxy is a copolymer of ethylene and glycidyl methacrylate (GMA) sold by Arkema under the reference Lotader AX8840, this copolymer comprising 8% by weight of GMA;

amino acid is 11-aminoundecanoic acid sold by Sigma-Aldrich under the reference 11-Aminoundecanoic acid;

carbon black is carbon black sold by Cabot under the reference Carbon Black VXC500, and has a BET specific surface area of 56 $m^2/g$ according to ASTM standard D 6556 (2014);

carbon nanotube 1 is a masterbatch comprising approximately 30% by weight of multi-walled carbon nanotubes in a polyethene matrix, sold by Arkema under the reference Graphistrength CM4-30; these carbon nanotubes have the following characteristics:
 a BET specific surface area of approximately 250 $m^2/g$ according to ASTM standard D 6556 (2014);
 a mean external diameter of 10 to 15 nanometers, measured by TEM;
 a length of 0.1 to 10 micrometers, measured by TEM; and
 an aspect ratio of the order of 100 to 1000.

carbon nanotube 2 is a masterbatch comprising 17% by weight of multi-walled carbon nanotubes in an ethylene vinyl acetate (EVA) copolymer matrix, sold by Nanocyl under the reference Plasticyl EVA 2001; these carbon nanotubes have the following characteristics:
 a BET specific surface area of between 250 and 300 $m^2/g$ according to ASTM standard D 6556 (2014);
 a mean external diameter of approximately 10 nanometers, measured by TEM;
 a mean length of approximately 1 micrometer, measured by TEM; and
 an aspect ratio of the order of 100.

The compositions collated in table 1 are processed as follows.

In a first step:
 For the composition C1, the carbon black is first of all mixed with the molten polymer in an internal mixer of twin-screw or Buss type, then the crosslinking agent is incorporated. The addition of the crosslinking agent in a separate step subsequent to the addition of the carbon black makes it possible to prevent any premature crosslinking of the polymer composition which may occur subsequent to the increase in temperature brought about by the addition of the carbon black. The crosslinking agent is thus added to the filler-comprising mixture once the mixture has cooled to a temperature of less than 130° C. The homogeneous mixture thus obtained is subsequently granulated.

For the compositions I1 and I2, the crosslinking agent and the masterbatch containing the carbon nanotubes are mixed together with the polymer in the molten state in an internal mixer of twin-screw or Buss type, the temperature within the mixer not exceeding 130° C. in order to prevent the opening of the epoxy functional group of the polymer and thus to prevent the crosslinking of the polymer. The homogeneous mixture thus obtained is subsequently granulated.

In a second step, the granules are subsequently introduced into a single-screw extruder and extruded at a maximum temperature of 130° C., in order to prevent any crosslinking of the polymer in the extruder.

The extrusion is carried out around a copper conductive wire with a cross section of 1.5 $mm^2$. An electrical cable comprising an extruded and non-crosslinked layer in direct contact with the conductive wire is obtained.

In a third step, the extruded layer is crosslinked by heating at a temperature of 200° C., said electrical cable being passed inside a steam tube under a steam pressure of 15 bar.

3. Characterization of the Semiconductive Crosslinked Materials

Various properties of the materials obtained from the compositions of table 1 have been measured and collated in table 3 below.

These properties relate to:

electrical conductivity, measured according to standard ISO 3915 under a direct current and at 25° C. before and after heat treatment at 200° C. (i.e. crosslinking), determined using a sourcemeter (source of current and voltage measurement) sold under the tradename 2611A by Keithley;

the hot set test (HST), determined using an oven at 200° C. according to standard BS EN 608 11-2-1, and more particularly to elongation under load and set; and stress at break and elongation at break, determined using a dynamometer according to standard IEC 60811-1-1.

TABLE 3

|  | C1 | I1 | I2 |
|---|---|---|---|
| Electrical conductivity (S/cm) before heat treatment at 200° C. | $2.0 * 10^{-1}$ | $9.0 * 10^{-12}$ | $6.8 * 10^{-9}$ |
| Electrical conductivity (S/cm) after heat treatment at 200° C. | $1.1 * 10^{-1}$ | $2.1 * 10^{-2}$ | $1.9 * 10^{-2}$ |
| HST: elongation under load (%) | 30-40% | 30-35% | 15-30% |
| HST: set (%) | 0-5% | 0-5% | 5% |
| Stress at break (MPa) | 17.3 ± 0.6 | 14.3 ± 0.5 | 13.9 ± 0.3 |
| Elongation at break (%) | 184 ± 19 | 309 ± 13 | 284 ± 12 |

The invention claimed is:

1. An electrical device comprising:
a semiconductive crosslinked layer obtained from a polymer composition comprising:
at least one polymer A comprising at least one epoxy functional group; and
a crosslinking agent B comprising at least one reactive functional group capable of reacting with the epoxy functional group of said polymer A in order to allow the crosslinking of said polymer A,
wherein the polymer composition additionally comprises an electrically conductive filler having a BET specific surface area of at least 100 m$^2$/g according to ASTM standard D 6556 (2014), and wherein the electrical conductivity of the polymer composition is lower than the electrical conductivity of the crosslinked layer.

2. The electrical device as claimed in claim 1, wherein the electrical conductivity of the polymer composition is preferably at least 10 times lower than the electrical conductivity of the crosslinked layer.

3. The electrical device as claimed in claim 1, wherein the amount of said electrically conductive filler is sufficient to allow the polymer composition to undergo a dynamic percolation transition.

4. The electrical device as claimed in claim 1, wherein the electrical conductivity of the crosslinked layer is at least $1 \cdot 10^{-3}$ S/m measured at 25° C. under a direct current.

5. The electrical device as claimed in claim 1, wherein polymer A is obtained from at least one olefin polymer.

6. The electrical device as claimed in claim 1, wherein the polymer composition comprises more than 50 parts by weight of polymer A per 100 parts by weight of polymer(s) in the polymer composition.

7. The electrical device as claimed in claim 1, wherein the gel content of the crosslinked layer, according to ASTM standard D 2765-01, is at least 50%.

8. The device as claimed in claim 1, wherein the aspect ratio of the electrically conductive filler is at least 10.

9. The device as claimed in claim 1, wherein the electrically conductive filler is a carbon filler.

10. The device as claimed in claim 1, wherein the electrically conductive filler is chosen from among carbon blacks, carbon fibers, graphites, graphenes, fullerenes, carbon nanotubes, and a mixture thereof.

11. The device as claimed in claim 1, wherein the polymer composition comprises at most 20.0 parts by weight of electrically conductive filler per 100 parts by weight of polymer A.

12. The device as claimed in claim 1, wherein the polymer composition is an electrical insulator.

13. The device as claimed in claim 1, the polymer composition additionally comprises a compound C comprising:
at least one aromatic group; and
a reactive group capable of interacting physically with the hydroxy functional group formed by the opening of said epoxy functional group during the crosslinking of polymer A.

14. The device as claimed in claim 13, wherein the reactive group of the compound C comprises a hydrogen atom.

15. The device as claimed in claim 13, wherein the reactive group of the compound C takes the form of a hydroxy group (OH) and/or an amine group (NH).

16. The device as claimed in claim 1, wherein the polymer A comprises at least one compound chosen from among the glycidyl esters.

17. The device as claimed in claim 1, wherein the polymer A comprises at most 10% by weight of epoxy functional group.

18. The electrical device as claimed in claim 1, wherein the crosslinking agent B is a non-polymeric compound.

19. The device as claimed in claim 1, wherein the reactive functional group of the crosslinking agent B is chosen from among an anhydride functional group, a carboxyl functional group and an amine functional group.

20. The device as claimed in claim 1, wherein the crosslinking agent comprises an amine functional group and a carboxyl functional group.

21. The device as claimed in claim 1, wherein the device is an electrical cable comprising an elongated electrically conductive element surrounded by said semiconductive crosslinked layer.

22. The device as claimed in claim 21, wherein the electrical cable comprises a first semiconductive layer surrounding the elongated electrically conductive element, an electrically insulating layer surrounding the first semiconductive layer, and a second semiconductive layer surrounding the electrically insulating layer, the crosslinked layer being the first and/or the second semiconductive layer.

23. The device as claimed in claim 1, wherein said device is an accessory for an electrical cable, said accessory comprising said crosslinked layer.

24. The device as claimed in claim 23, wherein the accessory is a junction or a termination for an electrical cable.

\* \* \* \* \*